United States Patent [19]

Carman

[11] 4,176,166

[45] * Nov. 27, 1979

[54] PROCESS FOR PRODUCING LIQUID SILICON

[75] Inventor: Justice N. Carman, Tarzana, Calif.

[73] Assignee: John S. Pennish, Los Angeles, Calif.; as part interest

[*] Notice: The portion of the term of this patent subsequent to Oct. 18, 1994, has been disclaimed.

[21] Appl. No.: 800,191

[22] Filed: May 25, 1977

[51] Int. Cl.$^2$ .............................................. C01B 33/02
[52] U.S. Cl. .................................... 423/350; 264/299
[58] Field of Search ..................... 423/350, 336, 335; 264/299

[56] References Cited

U.S. PATENT DOCUMENTS

| | | | |
|---|---|---|---|
| 2,904,404 | 9/1959 | Ellis, Jr. ................................ | 423/350 |
| 2,943,918 | 7/1960 | Pauls .................................... | 423/350 |
| 3,016,291 | 1/1962 | Aries .................................... | 423/350 |
| 3,071,444 | 1/1963 | Theuerer .............................. | 423/350 |
| 3,168,422 | 2/1965 | Allegretti et al. ............... | 423/350 X |
| 3,733,387 | 5/1973 | Kugler et al. ...................... | 423/336 |
| 3,865,647 | 2/1975 | Reuschel ........................... | 423/350 X |
| 4,054,641 | 10/1977 | Carman ................................ | 423/349 |

FOREIGN PATENT DOCUMENTS

| | | | |
|---|---|---|---|
| 1292640 | 4/1969 | Fed. Rep. of Germany ........... | 423/350 |
| 37-17454 | 10/1962 | Japan ...................................... | 423/350 |

OTHER PUBLICATIONS

Turovskii et al. "Izvestuya Akad., Nauk-SSSR, Neorg. Mat." vol. 10, No. 12, pp. 2108–2111, 1974.
Bacon et al. "Physics & Chemistry of Glass," Vol. 1, No. 3, 1960, pp. 90–98.
Brown et al. "J. of the Amer. Cer. Soc.," Vol. 42, No. 6, 1959, pp. 263–270.
Nassau et al. "Ceramic Bulletin," Vol. 54, No. 11, 1975, pp. 1004–1011.
Lever "IBM Journal," 1964, pp. 460–465.
Chartier et al. "Solid State Tech.," 1975, pp. 31–33.
Kaiser et al. "J. of Applied Physics," vol. 28, No. 8, pp. 882–887.

*Primary Examiner*—Jack Cooper
*Attorney, Agent, or Firm*—Harris, Kern, Wallen & Tinsley

[57] ABSTRACT

The method and apparatus for producing liquid silicon of high purity and for casting silicon. Hydrogen and a hydrogenated silane in gaseous state are mixed, preferably with a source of a small amount of oxygen, in a heated chamber producing the liquid silicon, with the exhaust gases bubbling out of the melt under a baffle. The chamber for the melt of liquid silicon preferably is lined with silicon dioxide. The liquid silicon may be used in making high purity vitreous silica and may be used in making castings of silicon. In making castings, the liquid silicon is accumulated in a second chamber and is periodically drawn from the second chamber into a third chamber which contains the mold for the casting.

9 Claims, 1 Drawing Figure

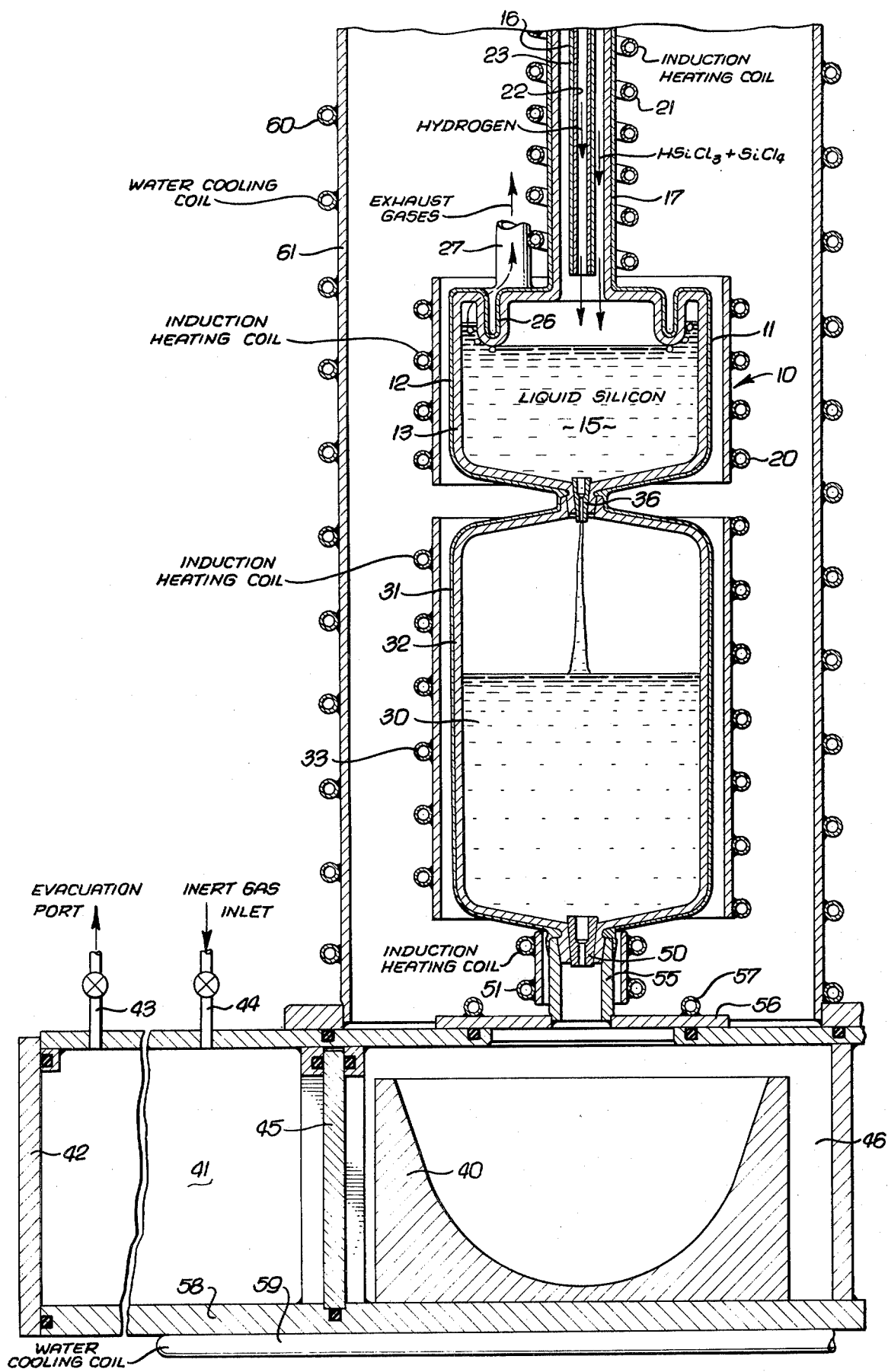

PROCESS FOR PRODUCING LIQUID SILICON

BACKGROUND OF THE INVENTION

This invention relates to method and apparatus for making liquid silicon of high purity suitable for use in the production of vitreous silica as described in my copending application, METHOD AND APPARATUS FOR MAKING VITREOUS SILICA, Ser. No. 684,108 filed May 7, 1976, now U.S. Pat. No. 4,054,641 and for making castings of silicon. The cast silicon may be in the form of billets for crystal pullers, in the form of tubes and boats for use in semiconductor processing equipment, in the form of infrared transmission windows, and the like.

The subject of vitreous silica is discussed extensively in the Encyclopedia of Chemical Technology, 2nd Ed. Vol. 18 by Kirk-Othmer at pages 73–105. Various types of silica glasses are discussed in the article Properties and Structure of Vitreous Silica by R. Bruckner in Journal of Non-Crystalline Solids 5(1970) 123–175. This article identifies four types of silica glasses by the manner in which they are produced and also refers to a fifth type produced in a plasma flame.

The silicon produced by the prior art processes and apparatus suffers from various disadvantages, primarily that of purity. It is an object of the present invention to provide a method and apparatus for producing liquid silicon the purity of which is limited only by that of the input materials.

SUMMARY OF THE INVENTION

The present invention provides method and apparatus for producing liquid silicon and silicon castings the purity of which is limited only by the purity of the starting materials.

Streams of hydrogen and halogenated silane in gaseous state are mixed in a heated chamber to produce liquid silicon. The exhaust gases are bubbled out of the melt under a baffle, and the chamber preferably is lined with silicon dioxide.

The liquid silicon may be drawn from the first chamber into a second chamber wherein liquid silicon is accumulated for the purpose of making castings, with the liquid silicon being drawn from the second chamber into a mold at periodic intervals. Alternatively, the liquid silicon may be utilized in making a high purity vitreous silica as described in the aforesaid copending application.

BRIEF DESCRIPTION OF THE DRAWING

The single FIGURE of the drawing is a sectional view of an apparatus for producing and casting liquid silicon.

DESCRIPTION OF THE PREFERRED EMBODIMENTS

The apparatus includes a source 10 of liquid silicon with the preferred form shown in the drawing. A container 11 has an outer wall 12 of a refractory metal such as tungsten or molybdenum and an inner lining 13 of fused quartz. The container may be made by fabricating fused quartz in the desired configuration and then plasma spraying the metal outer layer thereon. A pool of liquid silicon 15 is produced by mixing a stream of hydrogen in line 16 and a stream of trichlorosilane in line 17. The silicon is heated above its melting point 1685° K., as by means of an induction heating coil 20 positioned about the chamber 11. If desired, silicon tetrachloride can be used in combination with or in place of the trichlorosilane. Other halogenated silanes may be used, but most are more expensive and/or more difficult to handle. The two named are the only ones presently known to be available in commercial quantities.

The incoming gases in the tubes 16, 17 are heated by another induction heating coil 21, with the tube 16 preferably having a tungsten inner lining 22 and a fused quartz outer layer 23. The excess gases from the reaction which forms the liquid silicon bubble outward around a baffle 26 and are removed as exhaust gases through outlet line 27.

A second chamber 30 is positioned below the chamber 11 and preferably is made in the same manner as the upper chamber 11 with an outer wall 31 of a refractory metal and an inner lining 32 of fused quartz. The chamber 30 may be heated by another induction heating coil 33.

An orifice, preferably in an insert 36 at the junction between the upper chamber 11 and lower chamber 30, provides continuous flow of a fine stream of liquid silicon into the chamber 30. Typically the insert is made of a high temperature resistant material such as silicon carbide.

The silicon produced in the chamber 11 may be drawn directly from the chamber for further use, such as in the making of vitreous silica disclosed in my copending application, for making castings and for other uses as desired. When making castings, it is preferred to use the chamber 30 for accumulating a quantity of the liquid silicon sufficient for the desired casting, with the liquid silicon added to the chamber 30 from the chamber 11 in a substantially continuous stream, while being drawn from the chamber 30 periodically for filling a mold.

One mold handling configuration is shown in the drawing. It is desirable to perform the casting operation in an inert atmosphere. This may be accomplished by inserting a mold 40 into a first chamber 41 through a door 42. With the door closed, the chamber 41 is evacuated through line 43 and is them filled with an inert gas through line 44. A sliding door 45 is then opened permitting movement of the mold from the chamber 41 to another chamber 46, positioning the mold below an outlet of the chamber 30.

An orifice, preferably in an insert 50 at the lower end of the chamber 30, provides flow of liquid silicon from the chamber into the mold. Typically the insert is made of a high temperature resistant material such as silicon carbide. An induction heating coil 51 is positioned around the insert and may be used for controlling flow through the orifice. With the power to the heating coil 51 off, the silicon solidifies at the orifice and blocks flow from the chamber 30. When it is desired to make a casting, the heating coil 51 is energized, liquifying the silicon at the orifice and permitting flow of liquid silicon from the chamber 30 into the mold 40. When the mold is filled to the desired level, the power is turned off for the coil 51 permitting the silicon to freeze in the orifice. The mold is now ready for removal from the chamber 46. It may be removed through the chamber 41, or another exit chamber may be provided so that an empty mold can be introduced via the chamber 41 thereby reducing the time interval between pourings.

The mold typically is made of titanium because of its high melting point, with the inner surface preferably coated with a layer of silica which may be sprayed thereon. Alternatively, the mold may be of silicon with a silica lining. As another alternative, the mold may be entirely of silica similar to the standard crucibles used for Czochralski crystal growing. The portion of the structure adjacent the orifice outlet, including the sleeve 55 and the plate 56 preferably are made of a refractory metal such as tungsten, and a water cooling coil 57 may be mounted on the plate 56. Other portions of the chambers 41, 46 may be made of steel or other metals as desired. The plate 58 forming the bottom of the chambers 41 and 46 may be cooled by a water cooling coil 59. Cooling for the chambers 11 and 30 may be provided by another water cooling coil 60 carried on a sleeve 61 positioned about the chambers.

The chamber 11 is heated to maintain the silicon in a molten state, typically in the range of 1700° to 1900° K. It is desirable that the reactant gases be preheated prior to entering the chamber 11 for enhancing the reaction and this may be accomplished by the induction heating coil 21. Other methods of gas preheating may be utilized, but it is preferred to have the separate gas streams enter the chamber directly over the liquid silicon. The incoming gas streams provide a pressure in the chamber 11 which aids in ejecting the stream of liquid silicon into the chamber 30.

While the present invention is directed to method and apparatus for making pure silicon, various modifiers and dopants may be incorporated if desired. When the end product is to be an oxide, such as silica, modifiers are often used. Certain modifiers are given below by way of example and are not intended to limit the range of modifiers.

The sag point of fused silica may be raised about 100° K. by adding in the order of 0.20 to 0.25% alumina to the silica. This may be accomplished by including an aluminum halogen, such as aluminum chloride, in the trichlorosilane gas input.

The inclusion of about 10% titania reduces the coefficient of thermal expansion of silica from $55 \times 10^{-8}$ to approximately zero. Titania also increases the index of refraction of silica. Titania may be added in the form of titanium tetrachloride.

The incorporation of about $\frac{1}{4}$ to $\frac{1}{2}\%$ of neodymium oxide produces a silica suitable for use as a laser glass. The neodymium may be introduced as neodymium chloride. All of these metallic halogens become gaseous when heated and are easily handled in the apparatus disclosed herein.

When the end product is to be a semiconductor, dopants can be used. Typical dopants are boron, aluminum, gallium, phosphorous, arsenic and antimony, which are used in conventional quantities for semiconductors. The dopant may be introduced in gaseous compound form in the silane gas stream, typical compounds being diborane, phosphene and arsene.

Silica has a solubility in molten silicon in the order of 1–10 parts per million. Hence when a silica lining is used for a chamber containing molten silicon, such as the chamber 11, the molten silicon tends to erode the wall over a period of time. This erosion effect may be reduced or eliminated by maintaining the molten silicon saturated with oxygen.

In the embodiment disclosed herein, this may be accomplished by adding a small amount of water vapor to the hydrogen streams. It is preferred to provide a silica lining inside the tungsten 22 of tube 16 to protect the metal from the oxidizing effect of the water vapor.

In an alternative mode, a small amount of an oxysilane, in the order of 1–10 ppm, may be included with the halogenated silane to provide the oxygen for the silicon.

The optimum amount of the oxygen source material is best determined by experiment with the specific apparatus being used.

I claim:

1. In a method of producing silicon, the steps of:
maintaining a pool of liquid silicon in a first chamber having an inner wall of silica;
continuously mixing hydrogen and at least one halogenated silane in the gaseous state directly over the pool of liquid silicon;
heating the hydrogen and halogenated silane, with the hydrogen and silane reacting to produce additional liquid silicon in the pool;
maintaining the pool of liquid silicon substantially saturated with oxygen; and
continuously withdrawing liquid silicon from the pool.

2. The method of claim 1 wherein the silane is at least one of trichlorosilane and silicon tetrachloride.

3. The method as defined in claim 1 wherein the mixing step is carried out in a chamber lined with silicon dioxide.

4. The method of claim 1 wherein the oxygen is added by incorporating a small amount of water vapor in the hydrogen.

5. The method of claim 1 wherein the reaction also produces exhaust gases, and including the step of:
maintaining the level of the pool of liquid silicon above the lower edge of an exhaust baffle separating a gas outlet from the reaction section of the first chamber so that exhaust gases bubble from the pool of liquid silicon under the baffle to the gas outlet.

6. The method of claim 5 including the steps of:
withdrawing liquid silicon from the pool in the first chamber into a second chamber at a rate to maintain the level of the pool in the first chamber above the lower edge of the baffle and accumulating liquid silicon in the second chamber; and
heating the silicon in the second chamber to maintain it in the liquid state.

7. The method as defined in claim 6 including periodically drawing liquid silicon from the second chamber into a mold for making a silicon casting.

8. The method as defined in claim 6 wherein the mixing and accumulating steps are carried out in chambers lined with silicon dioxide.

9. The method of claim 1 wherein the oxygen is added by incorporating a small amount of an oxysilane in the halogenated silane.

* * * * *